Oct. 11, 1932.     E. A. NERBY     1,881,871

ANIMAL TRAP

Filed Sept. 1, 1928

Inventor
Edgar A. Nerby
By E. C. Brandenburg
Attorney

Patented Oct. 11, 1932

1,881,871

UNITED STATES PATENT OFFICE

EDGAR A. NERBY, OF WAUWATOSA, WISCONSIN

ANIMAL TRAP

Application filed September 1, 1928. Serial No. 303,485.

This invention relates to an improvement in animal traps.

The object of the invention is to provide an animal trap of the choke-type which prevents both the escape and the prolonged suffering of the animal after it has been caught.

The trap is extremely simple in character and may be set very easily without great danger of injuring the hands of the trapper while he is setting it, but after it has been set it may be sprung reasonably easy by the pressure of the animal against the trigger. A further object of the invention is to allow any of the various parts to be removed and replaced in the event that they may become corroded, rusted, or destroyed, which may be done by reason of the simple manner in which they are assembled.

Figure 1:
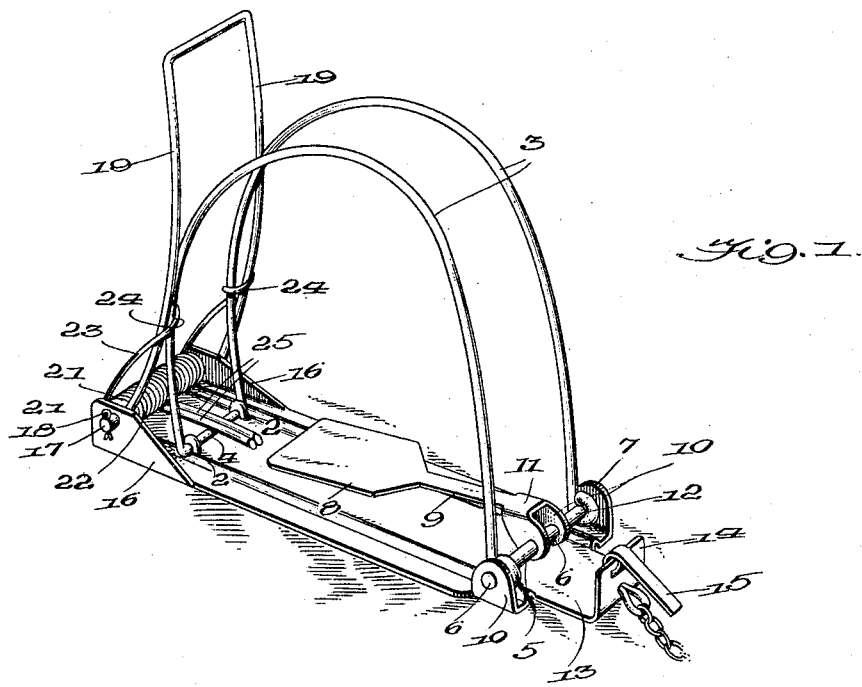
Fig. 1 is a perspective view of the trap in its sprung position.
Figure 2:
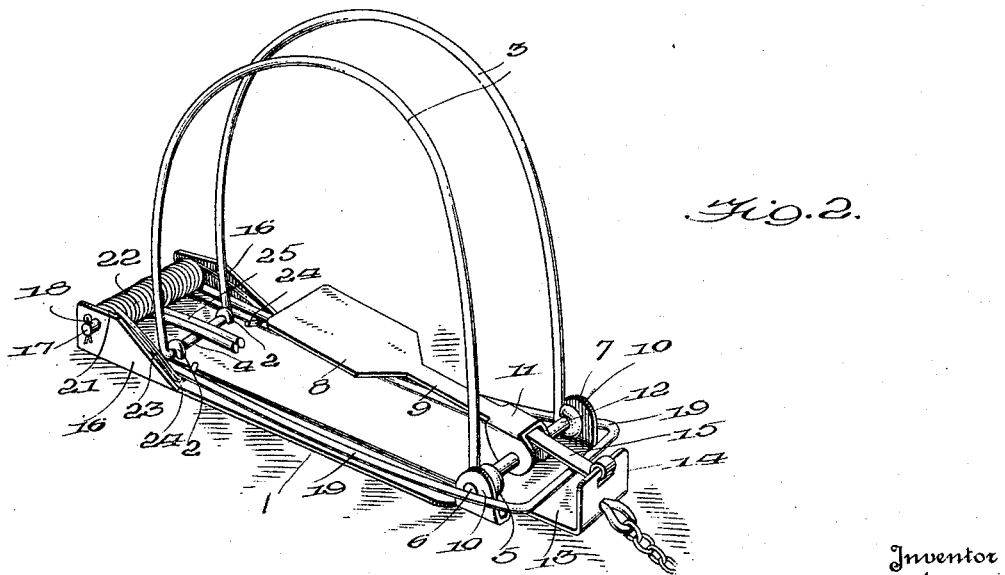
Fig. 2 is a similar view of the trap in its set position.

The numeral 1 indicates the base of the trap, which is provided near its back end with loops 2. Stationary jaws 3 are joined together by an intermediate portion 4 at their back ends, which portion extends through the loops 2 and secures the back ends of the jaws 3 to the base 1. The forward ends of the jaws 3 terminate in loops 5, through which a rod 6 extends, the opposite ends of the rod being fixed in ears 7 bent outwardly from the base 1. A trigger 8 is provided with a forwardly extending portion 9, which terminates in ears 10, which are in spaced apart relation and have a shoulder 11 arranged therebetween. The rod 6 extends through the ears 10 and pivotally supports the trigger 8 thereby. The trigger 8 is held in a central position on the base 1 by means of the sleeves 12, which are fitted over the rod 6 and are interposed between the ears 10 and the loops 5, holding the jaws 3 in their proper spaced apart relation also.

A flange 13 extends forwardly from the base 1 and has an upwardly extending lug 14 formed thereon to the upper end of which is pivotally attached a finger 15 of sufficient length so that the forward end thereof may hook under the shoulder 11 of the trigger. The back end of the base 1 is provided with the upturned flanges 16, in which is mounted a rod 17 to be removably held in place by the cotter pins 18.

Stationary jaws 19 are joined together at their outer ends by a connecting portion 20 and terminate at their inner ends in eyelets 21, through which the rod 17 extends to act as a pivotal mounting for the jaws 19. Coil springs 22 are sleeved over the rod 17, and each of these coil springs has an upwardly extending arm 23 terminating at its upper end in an inturned hook 24 extending into position to hook around the corresponding jaws 3 and 19 to limit the backward movement of the jaws 19 when the trap is sprung but normally acting on these jaws tending to move them into their sprung positions. The opposite ends 25 of the coil springs 22 extend forwardly over the connecting portion 4 of the jaws 3, so as to maintain tension on the springs 22.

Each of the shafts 6 and 17 is removably mounted in its supporting ears 7 and flanges 16 respectively by means of cotter pins or otherwise so as to allow the removal of the jaws, springs or the trigger in the event that any of them should become broken, corroded or otherwise injured, so that they may be replaced by new ones if desired.

The spacing of the jaws laterally apart from each other serves to hold the animal after it has been caught to prevent its escape while at the same time does not cause serious or prolonged suffering of the animal and prevents injurious cutting of the animal by the jaws.

I claim:

1. A trap including a base, a pair of fixed jaws mounted thereon, a pair of cooperating jaws pivotally mounted on the base, a resilient means terminating in forwardly extending hooks extending in position to hook around and engage the corresponding jaws of both pairs, and a trigger for the jaws.

2. A trap including a base, a pair of fixed jaws mounted thereon, a pair of pivotally mounted jaws, a shaft for pivotally supporting the pivotal jaws, springs sleeved on the shaft and having the corresponding ends thereof terminating in hooks extending around and normally engaging the pivotally mounted jaws for applying tension thereto and extending into position to engage the fixed jaws to limit the backward movement of the pivotal jaws and a trigger for the jaws.

3. A trap including a base having flanges carried thereby, a shaft removably mounted in said flanges, a pair of jaws pivotally mounted on the shaft, a pair of fixed jaws carried by the base, coil springs sleeved over the shaft and having the corresponding ends thereof terminating in hooks normally engaging the pivotal jaws for applying tension thereto and extending in position to engage the movable jaws to limit the backward movement of the pivotal jaws and a trigger for the jaws.

4. A trap including a fixed jaw and a movable jaw cooperating therewith, resilient means acting on the movable jaw, a hook for engaging the fixed jaw for limiting the movement of the movable jaw relative to the fixed jaw, and trigger means for holding the trap in set position.

5. A trap including a fixed jaw, and a movable jaw cooperating therewith, resilient means acting on the movable jaw, a hook connected with the movable jaw engaging the fixed jaw for limiting the movement of said movable jaw by the fixed jaw, and a trigger for the trap.

6. A trap including a fixed jaw and a movable jaw cooperating therewith, resilient means acting on the movable jaw, a hook carried by the resilient means for engaging the fixed jaw, and limiting the movement of the movable jaw relative thereto, and a trigger for the trap.

7. A trap including a base, a pair of wire jaws spaced apart and each having corresponding ends thereof fixed to the base, a shaft carried by the base and receiving the opposite corresponding ends of the jaws, a shaft arranged at the opposite end of the base, a pair of movable wire jaws mounted on said last-mentioned shaft, and a trigger mounted on the first-mentioned shaft.

8. A trap including a base having upturned ears thereon, a rod mounted in said ears, fixed jaws connected with the rod, movable jaws associated therewith, a trigger pivotally mounted on the rod and having a shoulder, an upturned lug on the base, and a finger pivoted to the upturned lug for engaging the shoulder of the trigger and holding the trigger in set position.

9. A trap comprising a base plate having upstanding ears arranged at an end thereof, upstanding flanges arranged approximately at the opposite end of the base, shafts mounted in said ears and flanges, a pair of fixed jaws connected with at least one of the shafts and having the ends thereof fixed, a pair of movable jaws connected with the other shafts and having the ends thereof fixed, resilient means acting on the movable jaws, and a trigger for the trap.

10. A trap comprising a base plate having a pair of upstanding ears arranged at an end thereof, a pair of upstanding flanges approximately at the opposite end of the base, shafts mounted in said ears and flanges, a pair of fixed jaws having the ends thereof fixed and connected with one of the shafts, a trigger pivotally mounted on said last mentioned shaft, a pair of movable jaws having the ends thereof connected with the other shaft, and resilient means acting on said movable jaws.

In testimony whereof I affix my signature.

EDGAR A. NERBY.